US012611951B2

(12) United States Patent
Saito et al.

(10) Patent No.: US 12,611,951 B2
(45) Date of Patent: Apr. 28, 2026

(54) BATTERY REPLACEMENT APPARATUS

(71) Applicant: TOYOTA JIDOSHA KABUSHIKI KAISHA, Toyota (JP)

(72) Inventors: Mamoru Saito, Toyota (JP); Shin Inoue, Okazaki (JP); Naoki Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/514,501

(22) Filed: Nov. 20, 2023

(65) Prior Publication Data

US 2024/0181912 A1     Jun. 6, 2024

(30) Foreign Application Priority Data

Dec. 5, 2022     (JP) ................................. 2022-194390

(51) Int. Cl.
| | |
|---|---|
| *B60L 53/37* | (2019.01) |
| *B60L 53/65* | (2019.01) |
| *B60L 53/80* | (2019.01) |

(52) U.S. Cl.
CPC .............. *B60L 53/37* (2019.02); *B60L 53/65* (2019.02); *B60L 53/80* (2019.02)

(58) Field of Classification Search
CPC ........... B60L 53/37; B60L 53/65; B60L 53/80
See application file for complete search history.

(56) References Cited

U.S. PATENT DOCUMENTS

| | | | | |
|---|---|---|---|---|
| 8,516,687 | B2 * | 8/2013 | Hozumi | B60K 1/04 |
| | | | | 187/218 |
| 10,870,365 | B2 * | 12/2020 | Ahrens | B60L 53/80 |
| 2012/0233850 | A1 | 9/2012 | Hozumi et al. | |
| 2015/0149015 | A1 * | 5/2015 | Nakano | B60L 58/12 |
| | | | | 701/22 |
| 2024/0181925 | A1 * | 6/2024 | Saito | B60L 53/66 |
| 2024/0181930 | A1 * | 6/2024 | Saito | B60L 58/22 |
| 2024/0383368 | A1 * | 11/2024 | Kundrot | B60L 53/80 |

FOREIGN PATENT DOCUMENTS

| | | | | | |
|---|---|---|---|---|---|
| CN | 115179906 | A * | 10/2022 | ............... | B60L 53/80 |
| CN | 116176511 | A * | 5/2023 | ............... | B60S 5/06 |
| CN | 111823938 | B * | 7/2023 | ............... | B60S 5/06 |
| CN | 118144739 | A * | 6/2024 | ............... | B60L 53/80 |
| CN | 118144740 | A * | 6/2024 | ............... | B60L 53/80 |
| CN | 118144742 | A * | 6/2024 | ............... | B60L 53/80 |
| JP | 2012-192783 | A | 10/2012 | | |
| JP | 2024080992 | A * | 6/2024 | ............... | B60K 1/04 |
| WO | WO-2022064230 | A1 * | 3/2022 | ............... | B60L 53/80 |

* cited by examiner

*Primary Examiner* — Saul Rodriguez
*Assistant Examiner* — Brendan P Tighe
(74) *Attorney, Agent, or Firm* — Dinsmore & Shohl LLP

(57)     ABSTRACT
A battery replacement apparatus replaces a first battery attached to a vehicle body of an electrically powered vehicle with a charged second battery. The battery replacement apparatus includes: an acquisition unit that acquires, based on a fact that a size of the second battery is specified, size information indicating the specified size; a mounting table that moves relative to the vehicle body, with the second battery mounted on the mounting table, for attaching the second battery of the specified size to the vehicle body; and an adjustment unit that adjusts, based on the size information, a mount position where the second battery is mounted on the mounting table.

4 Claims, 5 Drawing Sheets

BATTERY REPLACEMENT APPARATUS

CROSS-REFERENCE TO RELATED APPLICATIONS

This nonprovisional application is based on Japanese Patent Application No. 2022-194390 filed on Dec. 5, 2022 with the Japan Patent Office, the entire contents of which are hereby incorporated by reference.

BACKGROUND

Field

The present disclosure relates to a battery replacement apparatus.

Description of the Background Art

Japanese Patent Laying-Open No. 2012-192783 discloses a battery replacement apparatus for replacing a battery of an electrically powered vehicle. The battery replacement apparatus removes the battery attached to the electrically powered vehicle and attaches the charged battery to the electrically powered vehicle. Each of the battery removed from the electrically powered vehicle and the charged battery is carried by a battery mounting portion driven below the electrically powered vehicle.

SUMMARY

The battery replacement apparatus of Japanese Patent Laying-Open No. 2012-192783 only supports replacement of batteries of one size determined in advance. For this reason, the battery replacement apparatus cannot attach batteries of different sizes.

The present disclosure provides a battery replacement apparatus capable of attaching each of a plurality of batteries different in size from each other, to a vehicle body of an electrically powered vehicle.

According to an aspect of the present disclosure, a battery replacement apparatus replaces a first battery attached to a vehicle body of an electrically powered vehicle with a charged second battery. The battery replacement apparatus includes: an acquisition unit that acquires, based on a fact that a size of the second battery is specified, size information indicating the specified size; a mounting table that moves relative to the vehicle body, with the second battery mounted on the mounting table, for attaching the second battery of the specified size to the vehicle body; and an adjustment unit that adjusts, based on the size information, a mount position where the second battery is mounted on the mounting table.

According to the above-described configuration, the second battery can be mounted on the mounting table, at a position appropriate for the size of the second battery. Accordingly, each of a plurality of second batteries that are difference in size from each other can be attached to a vehicle body of an electrically powered vehicle.

In some embodiments, the adjustment unit includes: a restriction member that is movable relative to the mounting table and that adjusts the mount position where the second battery is mounted on the mounting table, by restricting movement of the second battery on the mounting table; and a position controller that controls, based on the size information, a relative position of the restriction member with respect to the mounting table.

According to the above-described configuration, the position controller controls the position of the restriction member to thereby enable the second battery to be mounted at a position appropriate for the size of the second battery.

In some embodiments, the battery replacement apparatus further includes a transport unit that transports the second battery onto the mounting table by transporting the second battery in a first direction. The restriction member restricts movement of the second battery in the first direction and a second direction perpendicular to the first direction. The adjustment unit further includes a drive unit that moves the restriction member in at least one of the first direction and the second direction. The position controller controls the relative position of the restriction member with respect to the mounting table, by driving the drive unit based on the size information.

According to the above-described configuration, movement of the second battery in at least one of the first direction and the second direction perpendicular to the first direction can be restricted by the drive unit and the restriction member.

In some embodiments, the battery replacement apparatus further includes: a detection device that detects a size of the second battery mounted on the mounting table; and a determination unit that determines whether the size detected by the detection device is identical to the specified size.

According to the above-described configuration, whether or not the second battery of the specified size is mounted on the mounting table can be confirmed before battery replacement.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Figure 1:
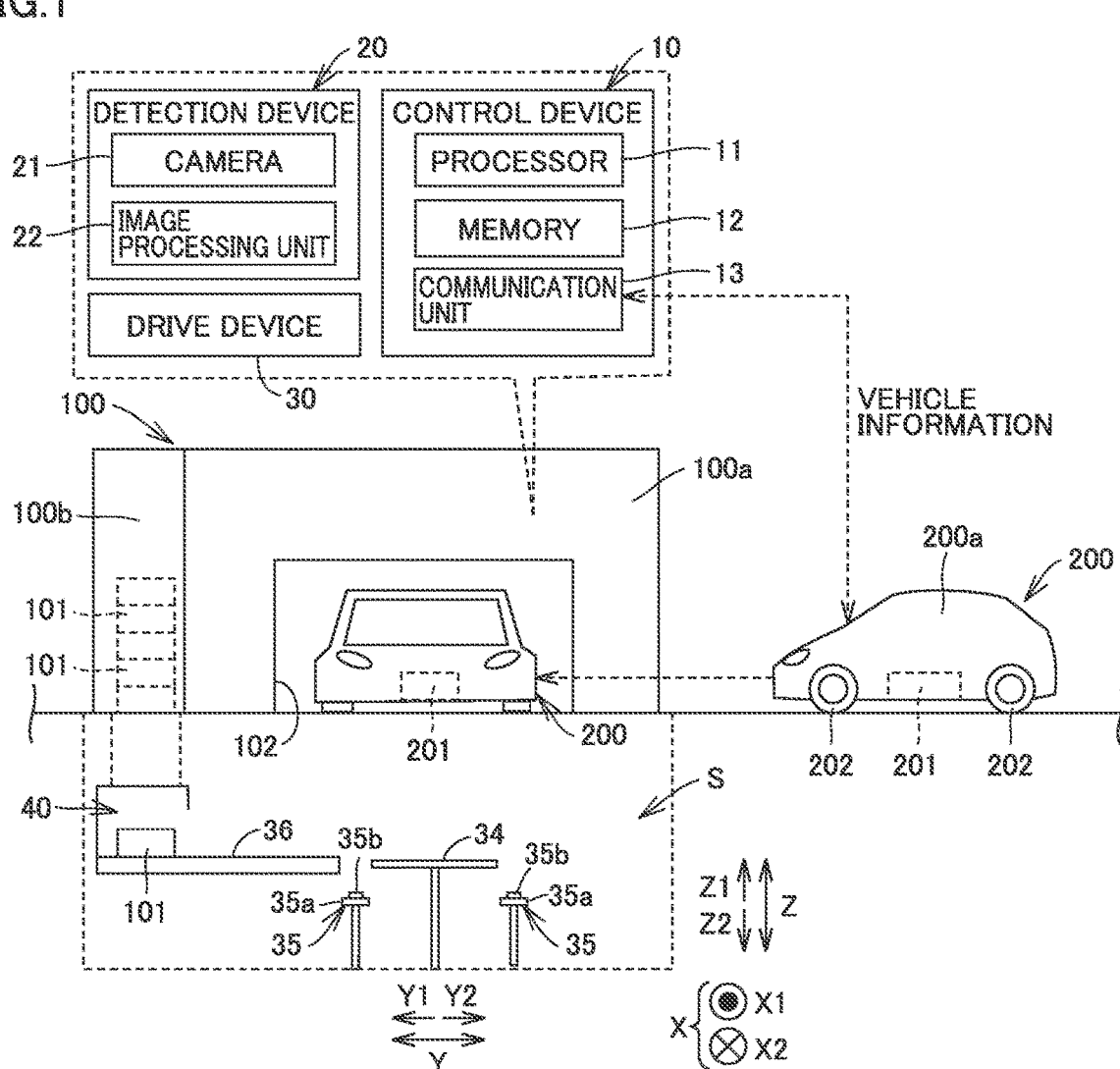
FIG. 1 is a diagram showing a battery replacement apparatus and an electrically powered vehicle.

Hereinafter, embodiments of the present disclosure will be described in detail with reference to the accompanying drawings. In the drawings, the same or corresponding parts are denoted by the same reference numerals, and the description thereof will not be repeated.

FIG. 1 is a diagram showing a battery replacement apparatus 100 and an electrically powered vehicle 200 according to the present embodiment. As shown in FIG. 1, a battery replacement apparatus 100 is an apparatus for replacing a battery 201 attached to a vehicle body 200a of an electrically powered vehicle 200 with a charged battery 101.

The electrically powered vehicle 200 is a hybrid electric vehicle that can travel by using power of at least one of a motor and an engine, or an electrically powered vehicle that travels by a driving force obtained by electric energy. The battery 201 and the battery 101 are rechargeable batteries (secondary batteries) such as ternary lithium ion batteries and iron phosphate lithium ion batteries. The battery 201 and the battery 101 are examples of the "first battery" and the "second battery" of the present disclosure, respectively.

The battery replacement apparatus 100 includes a battery replacement station 100a in which battery replacement is performed, and a storage 100b in which a charged battery 101 is stored. The storage 100b is provided in parallel with the battery replacement station 100a. The battery replacement station 100a is provided with an entrance/exit 102 for the electrically powered vehicle 200 to enter/exit.

After the battery 101 stored in the storage 100b is moved to the temporary placement site 40 provided in the underfloor area S, the battery 101 is conveyed to the electrically powered vehicle 200. The underfloor area S is provided with a battery mounting table 34, a raising/lowering unit 35, and a transport unit 36.

The battery replacement apparatus 100 includes a control device 10, a detection device 20, and a drive device 30. The control device 10 includes a processor 11, a memory 12, and a communication unit 13. The memory 12 stores, in addition to a program executed by the processor 11, information (e.g., map, formula, and various parameters) used by the program. The processor 11 controls the drive device 30.

The communication unit 13 includes various communication I/Fs (Inter Faces). The processor 11 controls the communication unit 13. The communication unit 13 communicates with DCM (Data Communication Module) and the like of the electrically powered vehicle 200. The communication unit 13 and the electrically powered vehicle 200 can perform bidirectional communication. The communication unit 13 may communicate with the information processing apparatus 300 (see FIG. 4) owned by the user of the electrically powered vehicle 200.

The electrically powered vehicle 200 transmits vehicle information about the electrically powered vehicle 200 to the communication unit 13 of the battery replacement apparatus 100. For example, when an operation of transmitting vehicle information is performed in a navigation system (not shown) of the electrically powered vehicle 200, the vehicle information is transmitted to the communication unit 13. The electrically powered vehicle 200 transmits vehicle information before entering the battery replacement apparatus 100. The vehicle information may be transmitted after the electrically powered vehicle 200 enters the battery replacement apparatus 100.

The detection device 20 includes a camera 21 and an image processing unit 22. The details of the detection device 20 will be described later.

Figure 2:
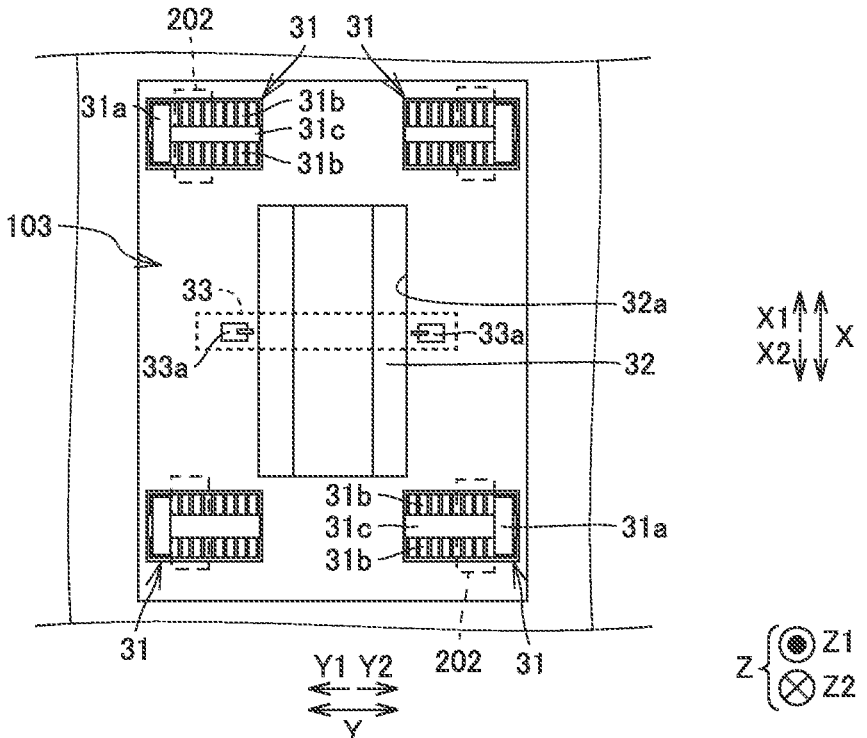
FIG. 2 is a plan view showing a vehicle stop area of the battery replacement apparatus.

FIG. 2 is a plan view showing a vehicle stop area of the battery replacement apparatus 100. As shown in FIG. 2, the battery replacement apparatus 100 is provided with a vehicle stop area 103. In a state in which the electrically powered vehicle 200 is stopped in the vehicle stop area 103, when the user performs an operation for instructing the start of the battery replacement operation in a navigation system (not shown) of the electrically powered vehicle 200, the communication unit 13 receives an instruction signal for starting the battery replacement operation from the electrically powered vehicle 200. The processor 11 starts the control of the battery replacement operation based on the reception of the instruction signal by the communication unit 13. The electrically powered vehicle 200 stops in the vehicle stop area 103 such that the front-rear direction is the X direction and the left-right direction is the Y direction.

The drive device 30 (refer to FIG. 1) includes a wheel chock 31, a shutter 32, a cleaning unit 33, a battery mounting table 34 (refer to FIG. 1), a raising/lowering unit 35 (refer to FIG. 1), a transport unit 36 (refer to FIG. 1), an adjustment unit 37 (refer to FIG. 3) and a guide unit (not shown) for guiding the battery 101.

Four wheel chocks 31 are provided in the vehicle stop area 103. The wheel chocks 31 are provided so as to correspond to the four wheels 202 of the electrically powered vehicle 200. The processor 11 adjusts the position of the wheel chock 31 based on the vehicle information acquired through the communication unit 13.

The wheel chock 31 includes a pressing member 31a, a pair of lateral roller portions 31b, and a slider portion 31c. The pressing member 31a is disposed so as to straddle the pair of lateral roller portions 31b and the slider portion 31c. The pressing member 31a moves the wheel 202 by pressing the wheel 202 from the outside (side). As a result, the wheel 202 is positioned by the wheel chock 31.

The lateral roller portion 31b is provided on each of the X1 side and the X2 side of the slider portion 31c. Each of the pair of lateral roller portions 31b includes a plurality of rollers whose rotation axes extend in the X direction. The plurality of rollers of the lateral roller portion 31b are arranged in the Y direction. By the rotation of the plurality of rollers of the lateral roller portion 31b, the pressing member 31a is moved along the Y direction.

The slider portion 31c moves the pressing member 31a placed on the wheel chock 31 along the X direction. The slider portion 31c may be of a belt conveyor type, for example. Note that the configuration of the wheel chock 31 is not limited to the above example. For example, either the lateral roller portion 31b or the slider portion 31c may not be provided.

The processor 11 controls the cleaning unit 33 to clean the battery 201. The cleaning unit 33 includes, for example, two nozzles 33a. The two nozzles 33a are provided so as to sandwich an opening 32a for retracting the battery 201 removed from the electrically powered vehicle 200 in the Y direction. The nozzle 33a discharges water from below the battery 201 toward the battery 201. Thus, the battery 201 is cleaned.

By opening the shutter 32, the opening 32a is exposed. Although FIG. 2 shows an example in which the shutter 32 is open at both sides, the shutter 32 may be open at one side.

Figure 3:
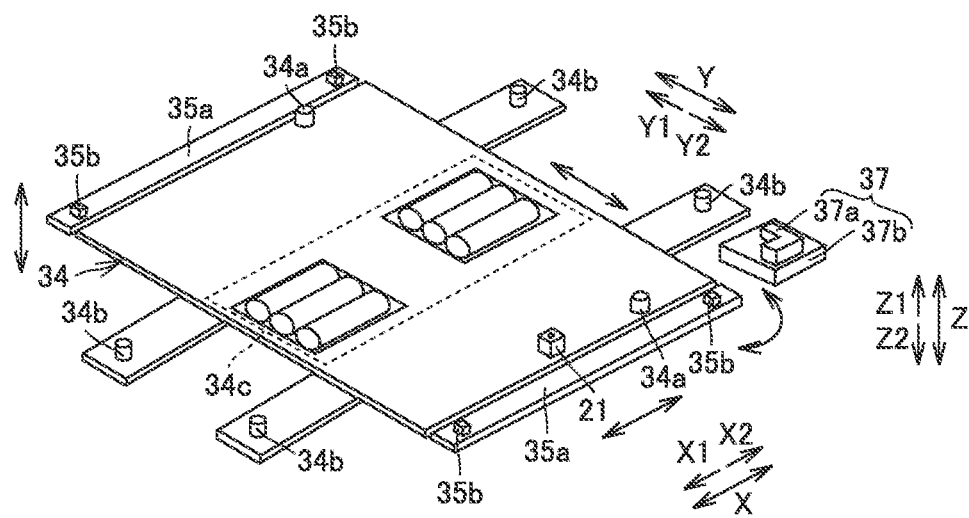
FIG. 3 is a perspective view showing a configuration of a battery mounting table of the battery replacement apparatus.

FIG. 3 is a perspective view showing a configuration of a battery mounting table 34 of the battery replacement apparatus 100. As shown in FIG. 3, the battery mounting table 34 is provided with two positioning pins 34a, four locking/unlocking tools 34b, and a roller portion 34c. The camera 21 is mounted (fixed) on the battery mounting table 34.

The camera 21 is mounted, for example, on an edge portion of the battery mounting table 34 on the Y2 side. The camera 21 may be provided at a position other than the battery mounting table 34 (for example, a raising/lowering bar 35a described later). The camera 21 may be configured to be movable with respect to the battery mounting table 34. A tapered surface is provided at the distal end of the positioning pin 34a. That is, the positioning pin 34a has a tapered shape toward the Z1 side.

In order to attach the battery 101 to the vehicle body 200a, the battery mounting table 34 moves relative to the vehicle body 200a in a state in which the battery 101 is mounted. The battery mounting table 34 is configured to be movable in a horizontal direction below the electrically powered vehicle 200. Specifically, the battery mounting table 34 is movable in the X direction (X1 direction, X2 direction) and the Y direction (Y1 direction, Y2 direction).

Referring again to FIG. 1, the transport unit 36 is configured to be able to transport the batteries (201, 101). Specifically, the transport unit 36 conveys the battery 201, which is detached from the electrically powered vehicle 200 and mounted on the battery mounting table 34, to the temporary placement site 40. When the roller portion 34c (see FIG. 3) of the battery mounting table 34 rotates in a state in which the battery mounting table 34 is lowered to the same height position (position in the Z direction) as the transport unit 36, the battery 201 mounted on the battery mounting table 34 is moved to the Y1 side and is mounted on the transport unit 36. The transport unit 36 moves the battery 201 to the temporary placement site 40. The transport unit 36 may be of a belt conveyor type, for example.

The transport unit 36 moves the charged battery 101 transported from the storage 100b to the temporary placement site 40 to the Y2 side and places the battery 101 on the battery mounting table 34. At this time, the roller portion 34c of the battery mounting table 34 rotates in the opposite direction to the above, whereby the battery 101 is moved to the Y2 side on the battery mounting table 34. Note that the Y2 direction and the X2 direction are examples of the "first direction" and the "second direction" of the present disclosure, respectively.

The raising/lowering unit 35 raises and lowers the electrically powered vehicle 200 by raising and lowering the electrically powered vehicle 200 while holding the electrically powered vehicle 200 from below. The raising/lowering unit 35 is movable in the vertical direction (Z direction) through the opening 32a (see FIG. 2). The raising/lowering unit 35 includes a pair of raising/lowering bars 35a. Each of the pair of raising/lowering bars 35a is provided with two protrusions 35b protruding toward the Z1 side. The electrically powered vehicle 200 is supported from below by two protrusions 35b (i.e., four protrusions 35b (see FIG. 3)) of each of the pair of raising/lowering bars 35a. Each of the pair of raising/lowering bars 35a may be movable similarly to the battery mounting table 34.

Referring again to FIG. 3, the adjustment unit 37 includes a stopper portion 37a and a movable portion 37b. The stopper portion 37a is disposed (fixed) on the movable portion 37b. The stopper portion 37a is an example of the "restriction member" of the present disclosure.

The stopper portion 37a restricts the movement of the battery 101 mounted on the battery mounting table 34 to each of the X2 side and the Y2 side. The stopper portion 37a defines the position in the horizontal direction of the corner portion 1011 (see FIG. 5) of the battery 101 mounted on the battery mounting table 34.

The stopper portion 37a has an L shape in a top view. The battery 101 has a rectangular shape in a top view. Accordingly, the stopper portion 37a contacts a part of the side surface 1012 (see FIG. 5) on the X2 side of the battery 101 and a part of the side surface 1013 (see FIG. 5) on the Y2 side of the battery 101.

The adjustment unit 37 is driven independently of the battery mounting table 34. Specifically, the movable portion 37b in which the stopper portion 37a is disposed is movable in the X direction (X1 direction, X2 direction) and the Y direction (Y1 direction, Y2 direction) independently of the battery mounting table 34.

After the movement of the battery 101 is restricted by the stopper portion 37a, the battery mounting table 34 raises the battery 101. Then, the battery 101 is attached to the vehicle body 200a of the electrically powered vehicle 200.

Referring again to FIG. 1, the detection device 20 detects the size of the battery 101 mounted on the mounting table 34. Specifically, the camera 21 images the battery 101 mounted on the mounting table 34. The image data obtained by the imaging is sent to the image processing unit 22. The image processing unit 22 determines the size of the battery 101 based on the image data. The image processing unit 22 notifies the control device 10 of the determination result. The detection device 20 may include a laser device or the like instead of the camera 21, as long as the detection device 20 can detect the size of the battery 101 mounted on the mounting table 34.

Figure 4:
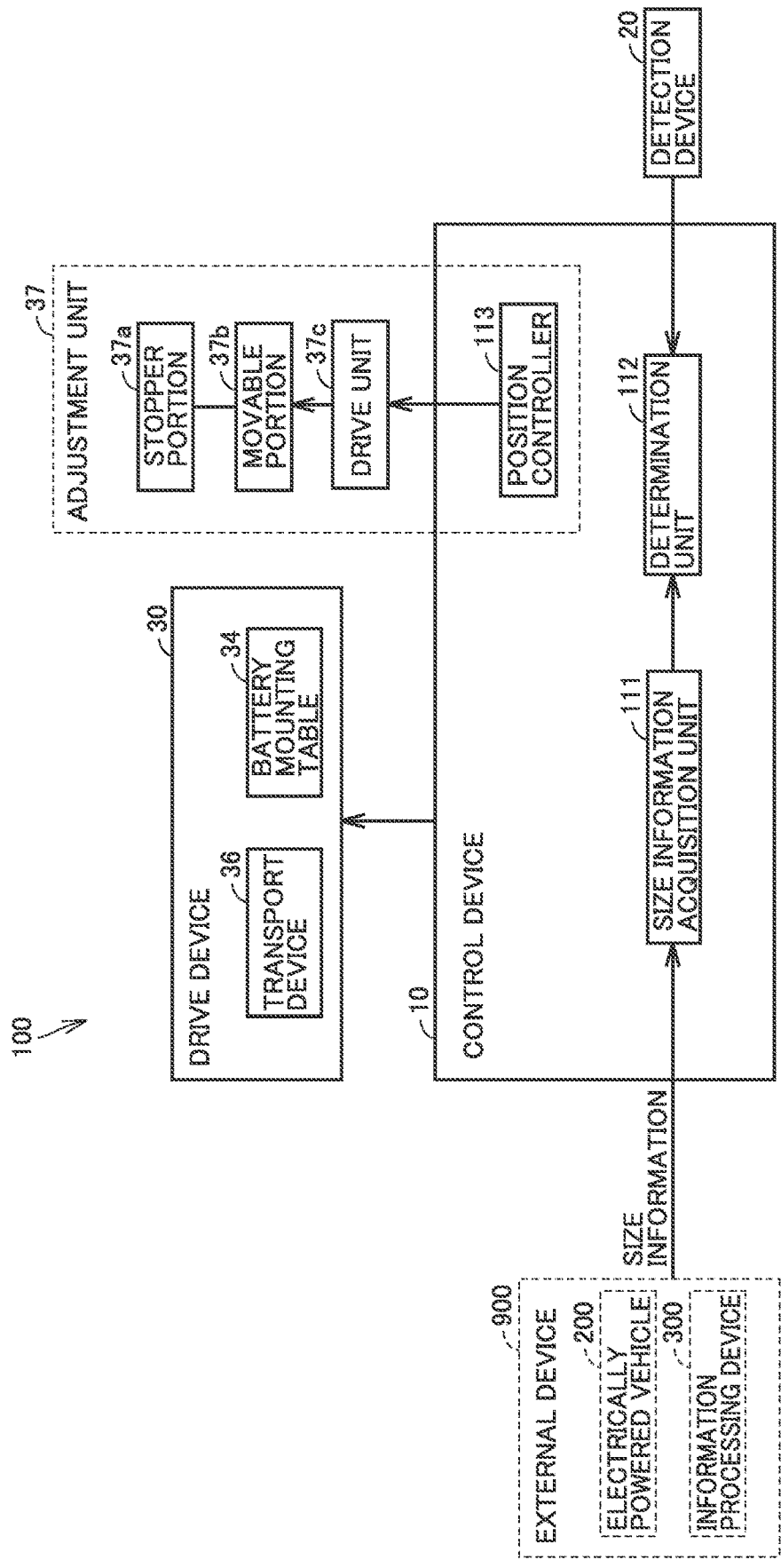
FIG. 4 is a block diagram illustrating a functional configuration of a battery replacement apparatus.

FIG. 4 is a block diagram illustrating a functional configuration of the battery replacement apparatus 100. As shown in FIG. 4, the battery replacement apparatus 100 includes a control device 10, a detection device 20, a drive device 30, and an adjustment unit 37. The battery replacement apparatus 100 can communicate with an external device 900. Examples of the external device 900 typically include the electrically powered vehicle 200 and the information processing apparatus 300.

The control device 10 includes a size information acquisition unit (acquisition unit) 111, a determination unit 112, and a position controller 113. As described above, the drive device 30 includes the battery mounting table (mounting table) 34 and the transport unit 36.

The size information acquisition unit 111 acquires size information indicating the specified size based on the fact that the size of the battery 101 is specified by the external device 900. For example, after the electrically powered vehicle 200 enters the battery replacement station 100a, an occupant (typically, a driver) of the electrically powered vehicle 200 specifies the size of the charged battery 101 via a touch panel or the like of the navigation system. Alternatively, the user wishing to use the battery replacement service specifies the size of the battery 101 by using the information processing apparatus 300 in advance. The information processing apparatus 300 is typically a terminal device such as a smartphone, a tablet terminal, or a computer.

In this example, the "size" indicates the size of the housing of the battery 101. Generally, the larger the size of the housing, the larger the battery capacity of the battery 101.

The size information acquisition unit 111 acquires the size information based on the size designation described above using the external device 900. As described above, the control device 10 receives designation of a desired size of the battery 101 in addition to vehicle information about the electrically powered vehicle 200.

The size can be specified, for example, by small (S), middle (M), and large (L). Further, as described above, since the battery capacity increases as the size of the battery 101 increases, the size can also be specified by specifying the capacity such as large capacity, medium capacity, and small capacity.

The designation of the size may not be direct as described above. The control device 10 may be any device as long as it can identify the size of the battery 101. For example, the control device 10 may acquire information (product number information or the like) specifying the type of the battery 101 from an external device, and the size information acquisition unit 111 may identify the size of the battery 101 (acquire size information) by comparing the information with reference information stored in the control device 10.

The adjustment unit 37 adjusts the mounting position of the battery 101 on the battery mounting table 34 based on the size information. In this example, the adjustment unit 37 includes a stopper portion 37a, a movable portion 37b, a drive unit 37c, and a position controller 113.

The stopper portion 37a is movable relative to the battery mounting table 34. The stopper portion 37a restricts the movement of the battery 101 on the battery mounting table 34, thereby adjusting the mounting position of the battery 101 on the battery mounting table 34. The position controller 113 controls the relative position of the stopper portion 37a with respect to the battery mounting table 34 based on the size information.

Specifically, the stopper portion 37a restricts the movement of the battery 101 to each of the X2 side and the Y2 side. The drive unit 37c moves the movable portion 37b and the stopper portion 37a in the X direction (X1 direction, X2 direction) and the Y direction (Y1 direction, Y2 direction). The position controller 113 controls the relative position of the stopper portion 37a with respect to the battery mounting table 34 by driving the drive unit 37c based on the size information. The drive unit 37c includes a motor and a motor driver. As the motor, for example, a stepping motor or a servo motor can be used.

As described above, the detection device 20 detects the size of the battery 101 mounted on the mounting table 34, and transmits the detected size to the control device 10. The determination unit 112 determines whether or not the size detected by the detection device 20 is identical to the size specified by the external device 900.

When the determination unit 112 determines that the sizes do not match, the control device 10 stops the battery replacement by the drive device 30. The control device 10 instructs the drive device 30 to take out a battery 101 different from the battery 101 placed on the mounting table 34 from the storage 100b. After that, when the same determination is made even when the battery 101 is replaced, the battery replacement apparatus 100 stops the replacement of the battery. Further, the battery replacement apparatus 100 sends a predetermined notification to the electrically powered vehicle 200.

Figure 5:
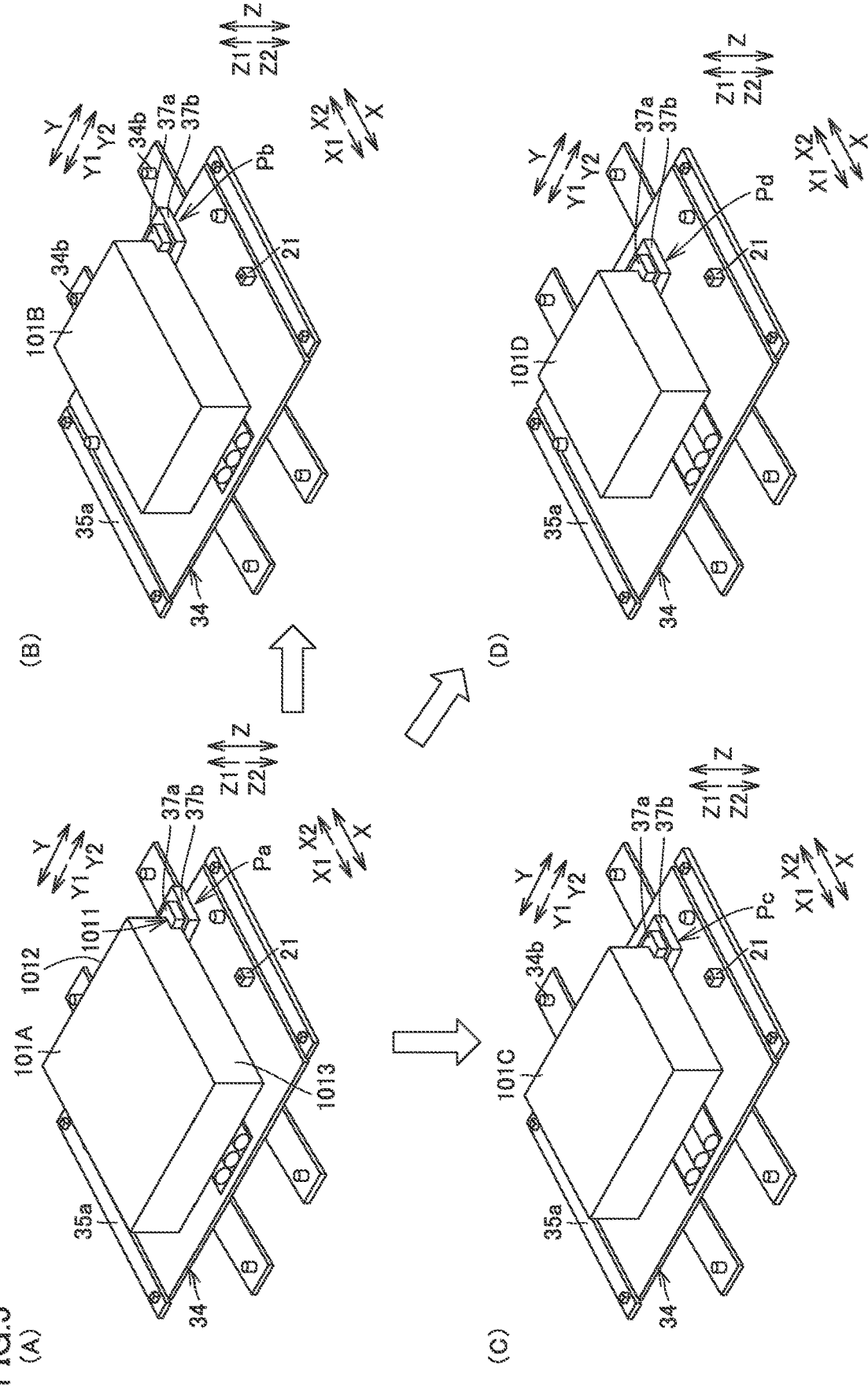
FIG. 5 is a state transition diagram for explaining an operation example of a stopper portion of the adjustment unit.

FIG. 5 is a state transition diagram for explaining an operation example of the stopper portion 37a of the adjustment unit 37. As shown in FIG. 5, a state (A) shows a state in which a large size battery 101 (hereinafter, referred to as a "battery 101A" for convenience) is mounted on the battery mounting table 34. The position of the stopper portion 37a in the state (A) (specifically, the relative position with respect to the battery mounting table 34) is referred to as a "position Pa".

Further, in the following description, for convenience of explanation, it is assumed that the large size battery 101A shown in the state (A) is normally attached to the vehicle body 200a. In this example, the position Pa is the default position of the stopper portion 37a.

The state (B) shows a state in which the battery 101 of the middle size (hereinafter, referred to as "battery 101B" for convenience) is mounted on the battery mounting table 34. The battery 101B is different from the large size battery 101A only in the length (width) in the Y direction among the length (depth) in the X direction, the length (width) in the Y direction, and the length (height) in the Z direction.

When the battery 101B is attached to the vehicle body 200a, the position controller 113 of the control device 10 moves the stopper portion 37a from the position Pa to the position Pb by moving the movable portion 37b by the drive unit 37c. Specifically, the position controller 113 controls the drive unit 37c to move the stopper portion 37a from the position Pa of the state (A) in the Y1 direction by a predetermined distance.

At the position Pb, the stopper portion 37a abuts against the corner portion 1011 of the battery 101B. Therefore, the movement of the battery 101B in the Y2 direction and the X2 direction is restricted. Therefore, the position of the battery 101B can be adjusted.

The state (C) shows a state in which the battery 101 (hereinafter, also referred to as a "battery 101C") of a middle size different in shape from the batteries 101A and 101B is mounted on the battery mounting table 34. The battery 101C is different from the large size battery 101A only in the length (depth) in the X direction among the length (depth) in the X direction, the length (width) in the Y direction, and the length (height) in the Z direction.

When the battery 101C is attached to the vehicle body 200a, the position controller 113 moves the stopper portion 37a from the position Pa to the position Pc in the state (A) by moving the movable portion 37b by the drive unit 37c. Specifically, the position controller 113 controls the drive unit 37c to move the stopper portion 37a from the position Pa in the X1 direction by a predetermined distance.

At the position Pc, the stopper portion 37a abuts against the corner portion 1011 of the battery 101C. Therefore, the movement of the battery 101C in the Y2 direction and the X2 direction is restricted. Therefore, the position of the battery 101C can be adjusted.

The state (D) is a state in which the small size battery 101 (hereinafter also referred to as a "battery 101D" for convenience) is placed on the battery mounting table 34. The length (depth) in the X direction and the length (width) in the Y direction of the battery 101D are different from those of the large size battery 101A.

When the battery 101D is attached to the vehicle body 200a, the position controller 113 moves the stopper portion 37a from the position Pa to the position Pd by moving the movable portion 37b by the drive unit 37c. Specifically, the position controller 113 controls the drive unit 37c to move the stopper portion 37a from the position Pa of the state (A) by a predetermined distance defined in the X1 direction and the Y1 direction, respectively.

At the position Pd, the stopper portion 37a abuts against the corner portion 1011 of the battery 101D. Therefore, the movement of the battery 101D in the Y2 direction and the X2 direction is restricted. Therefore, the position of the battery 101D can be adjusted.

Thus, the battery replacement apparatus 100 adjusts the position of the stopper portion 37a according to the size of the battery attached to the vehicle body 200a. In this example, the battery replacement apparatus 100 adjusts the position of the stopper portion 37a so that the battery 101, 101A, 101B and 101C is positioned at the center of the battery mounting table 34.

The movement of the stopper portion 37a is performed before the batteries 101A, 101B, and 101C are mounted on the battery mounting table 34. However, the present disclosure is not limited thereto, and the batteries 101A, 101B, and 101C can be moved on the battery mounting table 34 by moving the stopper portion 37a after the batteries 101A, 101B, and 101C are mounted at predetermined positions on the battery mounting table 34.

After the battery 101 (101A to 101D) is placed in the center of the battery mounting table 34 by the position adjustment by the adjustment unit 37, the battery replacement apparatus 100 moves the battery mounting table 34 to, for example, the X1 side by a distance corresponding to the size of the battery. As a result, the connector (not shown) such as the battery 101 can be placed immediately below the connector (not shown) on the vehicle body 200*a* side. Then, the battery replacement apparatus 100 raises the battery mounting table 34. Thereby, the connector such as the battery 101 and the connector battery on the vehicle body 200*a* side can be connected to each other.

Figure 6:
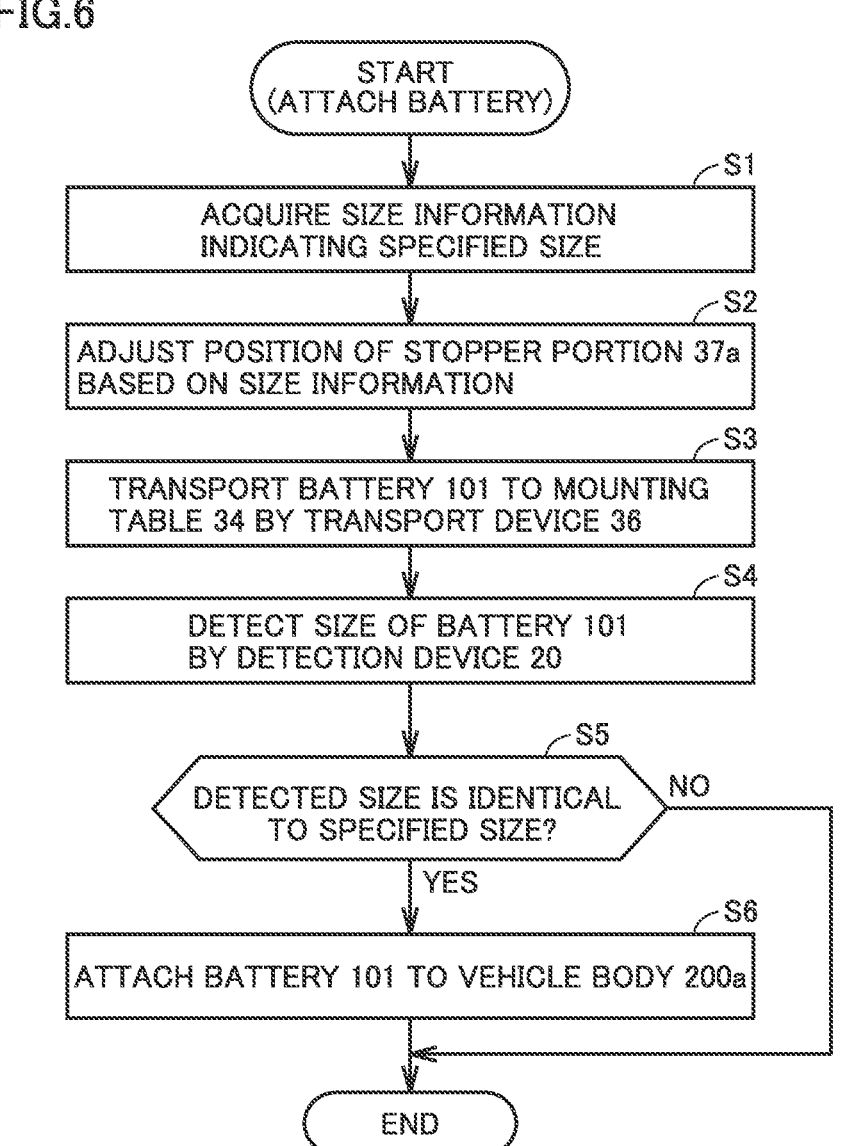
FIG. 6 is a flowchart for explaining a flow of processing when a battery is mounted.

FIG. 6 is a flowchart for explaining the flow of processing when the battery 101 is attached to the vehicle body 200*a*. As shown in FIG. 6, in step S1, the control device 10 acquires size information indicating the size of the battery specified by the external device 900. In step S2, the control device 10 adjusts the position of the stopper portion 37*a* based on the size information. In step S3, the control device 10 conveys the battery 101 (charged battery) of the specified size to the battery mounting table 34 by the transport unit 36. In step S4, the detection device 20 detects the size of the conveyed battery 101.

In step S5, the control device 10 determines whether or not the detected size matches the specified size. When it is determined that they are identical to each other (YES in step S5), the control device 10 attaches the charged battery 101 placed on the battery mounting table 34 to the vehicle body 200*a*, in step S6. When it is determined that they do not match (NO in step S5), the control device 10 ends the processing without attaching the battery 101 to the vehicle body 200*a*. More specifically, in this example, the control device 10 performs replacement of the battery 101, a predetermined notification, and the like before ending the processing, as described above.

In the above description, a configuration in which the mounting table 34 of the battery replacement apparatus 100 moves with respect to the stopped electrically powered vehicle 200 at the time of battery replacement has been described as an example, but the present disclosure is not necessarily limited thereto. The battery replacement apparatus 100 may be configured such that at least one of the electrically powered vehicle 200 and the mounting table 34 moves. That is, the mounting table 34 may be moved relative to the vehicle body 200*a* in a state in which the battery 101 is mounted. Similarly, the stopper portion 37*a* may be movable relative to the battery mounting table 34.

BRIEF SUMMARY

The following is a brief summary of a part of the configuration of the battery replacement apparatus 100.

(1) The battery replacement apparatus 100 replaces the battery 201 attached to the vehicle body 200*a* of the electrically powered vehicle 200 with the charged battery 101. The battery replacement apparatus 100 includes a size information acquisition unit 111 that acquires, based on the fact that the size of the battery 101 is specified, size information indicating the specified size. The battery replacement apparatus 100 includes a battery mounting table 34 that moves relative to the vehicle body 200*a*, with the battery 101 mounted on the battery mounting table, for attaching the battery 101 of the specified size to the vehicle body 200*a*. The battery replacement apparatus 100 includes an adjustment unit 37 that adjusts, based on the size information, the mount position where the battery 101 is mounted on the battery mounting table 34.

According to this configuration, the battery 101 can be mounted on the battery mounting table 34 at a position corresponding to the size of the battery 101. Accordingly, a plurality of charged batteries 101 having different housing sizes can be attached to the vehicle body 200*a* of the electrically powered vehicle 200.

(2) The adjustment unit 37 is movable relative to the battery mounting table 34, and includes a stopper portion 37*a* that adjusts the mount position of the battery 101 on the battery mounting table 34 by restricting the movement of the battery 101 on the battery mounting table 34. The adjustment unit 37 includes a position controller 113 that controls the relative position of the stopper portion 37*a* with respect to the battery mounting table 34 based on the size information.

According to this configuration, the position controller 113 controls the position of the stopper portion 37*a*, whereby the battery 101 can be placed at a position corresponding to the size of the battery 101.

(3) The battery replacement apparatus 100 further includes a transport unit 36 that transports the battery 101 onto the battery mounting table 34 by transporting the battery 101 in the Y2 direction. The stopper portion 37*a* restricts the movement of the battery 101 in the X2 direction perpendicular to the Y2 direction and the Y2 direction. The adjustment unit 37 further includes a drive unit 37*c* that moves the stopper portion 37*a* in the Y2 direction and the X2 direction. The position controller 113 controls the relative position of the stopper portion 37*a* with respect to the battery mounting table 34 by driving the drive unit 37*c* based on the size information.

According to this configuration, the movement of the battery 101 in the X2 direction perpendicular to the Y2 direction and the Y2 direction can be restricted by the drive unit 37*c* and the stopper portion 37*a*.

(4) The battery replacement apparatus 100 further includes a detection device 20 that detects the size of the battery 101 mounted on the battery mounting table 34. The battery replacement apparatus 100 further includes a determination unit 112 that determines whether the size detected by the detection device 20 is identical to the specified size.

According to this configuration, whether or not the battery 101 of the specified size is mounted on the battery mounting table 34 can be confirmed before battery replacement.

(5) The size of the battery 101 is specified using the electrically powered vehicle 200 or the external information processing apparatus 300.

APPENDIX (1) A control method for replacing a first battery attached to a vehicle body of an electrically powered vehicle with a charged second battery, the control method including:

acquiring, based on a fact that a size of the second battery is specified, size information indicating the specified size;

moving a mounting table relative to the vehicle body, with the second battery mounted on the mounting table, for attaching the second battery of the specified size to the vehicle body; and adjusting, based on the size information, a mount position where the second battery is mounted on the mounting table.

(2) In the control method, the moving is performed after the adjusting.

(3) In the control method, the moving is performed before the adjusting.

(4) In the control method, the moving and the adjusting are performed at the same timing.

(5) A program that causes one or more processors to perform each step of the control method.

(6) A non-transitory computer-readable storage medium having the program stored thereon.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A battery replacement apparatus for replacing a first battery attached to a vehicle body of an electrically powered vehicle with a charged second battery, the battery replacement apparatus comprising:

an acquisition unit that acquires, based on a fact that a size of the second battery is specified, size information indicating the specified size;

a mounting table that moves relative to the vehicle body, with the second battery mounted on the mounting table, for attaching the second battery of the specified size to the vehicle body;

an adjustment unit that adjusts, based on the size information, a mount position where the second battery is mounted on the mounting table; and a vehicle stop area having a surface for supporting the vehicle body thereon and the surface defining an opening for accessing the vehicle body therethrough, the mounting table configured to move the second battery through the opening of the vehicle stop area for attaching the second battery to the vehicle body; and a camera positioned on the mounting table and detecting a size of the second battery mounted on the mounting table through visual inspection.

2. The battery replacement apparatus according to claim 1, wherein the adjustment unit includes:

a restriction member that is movable relative to the mounting table and that adjusts the mount position where the second battery is mounted on the mounting table, by restricting movement of the second battery on the mounting table; and a position controller that controls, based on the size information, a relative position of the restriction member with respect to the mounting table.

3. The battery replacement apparatus according to claim 2, further comprising a transport unit that transports the second battery onto the mounting table by transporting the second battery in a first direction, wherein the restriction member restricts movement of the second battery in the first direction and a second direction perpendicular to the first direction, the adjustment unit further includes a drive unit that moves the restriction member in at least one of the first direction and the second direction, and the position controller controls the relative position of the restriction member with respect to the mounting table, by driving the drive unit based on the size information.

4. The battery replacement apparatus according to claim 1, further comprising:

a determination unit that determines whether the size detected by the camera is identical to the specified size.

* * * * *